(12) United States Patent
Perry

(10) Patent No.: US 12,207,171 B2
(45) Date of Patent: Jan. 21, 2025

(54) SMART SPEAKERPHONE EMERGENCY MONITORING

(71) Applicant: Alarm.com Incorporated, Tysons, VA (US)

(72) Inventor: Roy Franklin Perry, Niwot, CO (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 18/107,225

(22) Filed: Feb. 8, 2023

(65) Prior Publication Data

US 2023/0199463 A1    Jun. 22, 2023

Related U.S. Application Data

(63) Continuation of application No. 16/951,437, filed on Nov. 18, 2020, now Pat. No. 11,589,204.

(60) Provisional application No. 62/940,284, filed on Nov. 26, 2019.

(51) Int. Cl.
*H04W 4/90* (2018.01)
*H04M 11/04* (2006.01)
*H04W 4/029* (2018.01)

(52) U.S. Cl.
CPC ............. *H04W 4/90* (2018.02); *H04M 11/04* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 6,539,084 B1 * | 3/2003 | Long | H04W 76/10 |
| | | | 379/159 |
| 7,492,913 B2 * | 2/2009 | Connor | H04S 7/303 |
| | | | 381/77 |
| 8,378,808 B1 | 2/2013 | Gwaltney | |
| 10,255,792 B2 | 4/2019 | Farrand et al. | |
| 10,803,720 B2 | 10/2020 | Bucsa et al. | |
| 2007/0042804 A1 | 2/2007 | Ryley et al. | |
| 2007/0286375 A1 | 12/2007 | Baum | |
| 2008/0172232 A1 | 7/2008 | Gurley | |
| 2013/0120131 A1 | 5/2013 | Hicks, III | |
| 2015/0054639 A1 | 2/2015 | Rosen | |
| 2015/0071038 A1 | 3/2015 | Boyden et al. | |

(Continued)

*Primary Examiner* — German Viana Di Prisco
(74) *Attorney, Agent, or Firm* — Fish & Richardson P.C.

(57) ABSTRACT

Methods, systems, and apparatus for smart speakerphone emergency monitoring are disclosed. A method includes detecting a sound at one or more of multiple locations of a property; determining that the sound indicates an emergency at the property; sending, to a monitoring station, an indication of the emergency; receiving, from the monitoring station, a two-way voice call; and broadcasting the two-way voice call to the multiple locations of the property. Detecting the sound at one or more of multiple locations of a property includes receiving audio data generated by one or more of a plurality of speakerphones, each speakerphone being located at one of the multiple locations of the property. Each speakerphone includes an audio microphone and an audio speaker, the speakerphone being configured to communicate with a speakerphone hub device using digital enhanced cordless telecommunications (DECT) signals.

20 Claims, 5 Drawing Sheets

(56) References Cited

U.S. PATENT DOCUMENTS

| | | |
|---|---|---|
| 2015/0163609 A1* | 6/2015 | Mahasenan ......... H04L 12/1895 |
| | | 381/82 |
| 2015/0194034 A1 | 7/2015 | Shim et al. |
| 2015/0194152 A1* | 7/2015 | Katuri ................. G10L 21/0208 |
| | | 704/231 |
| 2015/0356849 A1* | 12/2015 | Ishii ................... G08B 21/0423 |
| | | 340/573.1 |
| 2016/0373909 A1 | 12/2016 | Rasmussen et al. |
| 2017/0309142 A1 | 10/2017 | Phillips |
| 2018/0061189 A1 | 3/2018 | Anand et al. |
| 2019/0152747 A1 | 5/2019 | Singaraju |
| 2020/0105120 A1 | 4/2020 | Werner et al. |
| 2020/0186644 A1 | 6/2020 | White et al. |
| 2020/0273321 A1 | 8/2020 | Desjardins |
| 2020/0280702 A1* | 9/2020 | Singh ..................... H04N 7/181 |
| 2020/0302951 A1 | 9/2020 | Deng et al. |

* cited by examiner

SMART SPEAKERPHONE EMERGENCY MONITORING

CROSS-REFERENCE TO RELATED APPLICATIONS

This application is a continuation of U.S. application Ser. No. 16/951,437, filed Nov. 18, 2020, which claims the benefit of the U.S. Provisional Patent Application No. 62/940,284, filed Nov. 26, 2019. The disclosure of each of the foregoing applications is incorporated herein by reference.

TECHNICAL FIELD

This disclosure application relates generally to property monitoring systems with smart speakerphones.

BACKGROUND

This disclosure application relates generally to property monitoring systems with smart speakerphones. Many properties are equipped with monitoring systems that include sensors and connected system components. Some monitoring systems include smart speakerphones that may detect sounds from areas around a property.

SUMMARY

Techniques are described for smart speakerphone emergency monitoring. Smart speakerphones can initiate and facilitate voice communication with a remote monitoring station in response to a detected emergency at property. For example, a user can say the word "help" near any smart speakerphone at the property, and an operator at the monitoring station can promptly respond through the smart speakerphone via a two-way voice call.

Smart speakerphones can be distributed throughout a property and can detect sounds from various areas of the property. The smart speakerphones can analyze the sounds to determine if the sounds meet criteria for key sounds that may indicate a possible emergency at the property. The smart speakerphones can analyze the sounds, for example, by performing speech recognition, voice recognition, volume measurement, and/or sound matching. The smart speakerphones can identify key sounds that match pre-programmed words or phrases, or that match pre-programmed non-word sounds. The smart speakerphone can also identify key sounds that are above a preset volume level.

The smart speakerphones can include batteries that enable operation without an external source of power. The smart speakerphones can include transmitters and receivers for high quality low power signals, e.g., digital enhanced cordless telecommunications (DECT) signals. The DECT transmitters and receivers can enable the smart speakerphones to operate without an internet connection. Upon identifying a key sound, the smart speakerphones can send the key sound to a speakerphone hub device via DECT transmission.

The hub can receive key sounds from each of the smart speakerphones at the property. The hub can analyze the key sounds and additional data from the smart speakerphones to determine that there is a possible emergency at the property. Based on determining that there is a possible emergency at the property, the hub can send an alert to a monitoring station, e.g., through a cellular network. The monitoring station can include operators that can view information related to the alert on a display of an electronic device.

The monitoring station can initiate a two-way call between the operator at the monitoring station and the hub. The hub can broadcast the two-way call to the smart speakerphones distributed throughout the property. Residents of the property can communicate with the operator by speaking near any of the smart speakerphones. Through the two-way call, the operator can gather information from the resident, can advise the resident of actions to take in response to the emergency, and can notify the resident when emergency responders are dispatched.

In some examples, the smart speakerphones and the hub can operate as a stand-alone system. For example, the property might not include any other sensors and might not include a monitoring system control unit. The smart speakerphone emergency monitoring system can therefore operate independently and can communicate directly with the monitoring station.

In some examples, the smart speakerphone and the hub can be integrated into a larger monitoring system. For example, the property may include additional sensors and a control unit. In these examples, the smart speakerphones may communicate with the hub, the control unit, or both. The hub may communicate directly with the monitoring station, or may communicate with the monitoring station through the control unit. The control unit can collect and analyze sounds from the smart speakerphones, as well as sensor data from other sensors, to determine conditions at the property. For example, the control unit may correlate key sounds detected by the smart speakerphones with camera data and motion sensor data in order to determine if there is a likely emergency at the property.

In some examples, a user can use the smart speakerphones to initiate voice calls. For example, a user can speak the words "call mom" near any smart speakerphone. The smart speakerphone can send the request "call mom" to the hub. The hub can initiate a cellular call to a saved contact "mom." The hub can then broadcast the cellular call over one or more of the smart speakerphones of the property.

In some examples, a user can use the smart speakerphones to receive voice calls in any area of the property. For example, an outside contact can place a cellular call to a phone number associated with the hub. The hub can broadcast a notification sound to any or all of the smart speakerphones at the property. The user can receive the call, for example, by speaking the word "answer" near any of the smart speakerphones. The hub can then broadcast the call to any or all of the smart speakerphones of the property.

In some examples, the smart speakerphones can connect to an internet network. A user can use the smart speakerphones to place orders and requests over the internet. For example, a user can speak the words "request ride sharing service" near a smart speakerphone. The smart speakerphone can send the request to an internet website, initiating a ride sharing service pickup at the property. The user can provide additional instructions and can receive updates on the request through any or all of the smart speakerphones of the property.

Smart speakerphone emergency monitoring can provide the following advantages. In some examples, smart speakerphone emergency monitoring can reduce false alarms that may be caused by monitoring systems. Connecting an operator with a user via a two-way voice call enables the operator to confirm there is an emergency before dispatching emergency responders. Broadcasting the two-way call to all of the smart speakerphones at the property enables the operator to speak to the user in any area of the property.

Personal emergency response systems (PERS) systems often require a user to wear or carry a PERS device, such as a pendant or wristband. When the user requires assistance, the user presses a transmitter button on the device in order to contact a monitoring station. In some cases, the user may not want to wear the device, or may forget to wear the device. In some cases, the user may not be able to press the transmitter button when the user requires assistance. Positioning smart speakerphones throughout a property can enable the user to contact the monitoring station without needing to carry or wear a PERS device, and without needing to press a transmitter button to request assistance.

The smart speakerphones and the hub each include batteries that enable operation without external power sources. Additionally, the smart speakerphones can communicate with the hub via DECT. DECT transmission uses low power and does not require an internet connection. The hub can communicate with the monitoring station via a cellular network, also without requiring an internet connection. Therefore, a smart speakerphone emergency monitoring system can perform normal operations during a power outage, an internet outage, or both.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
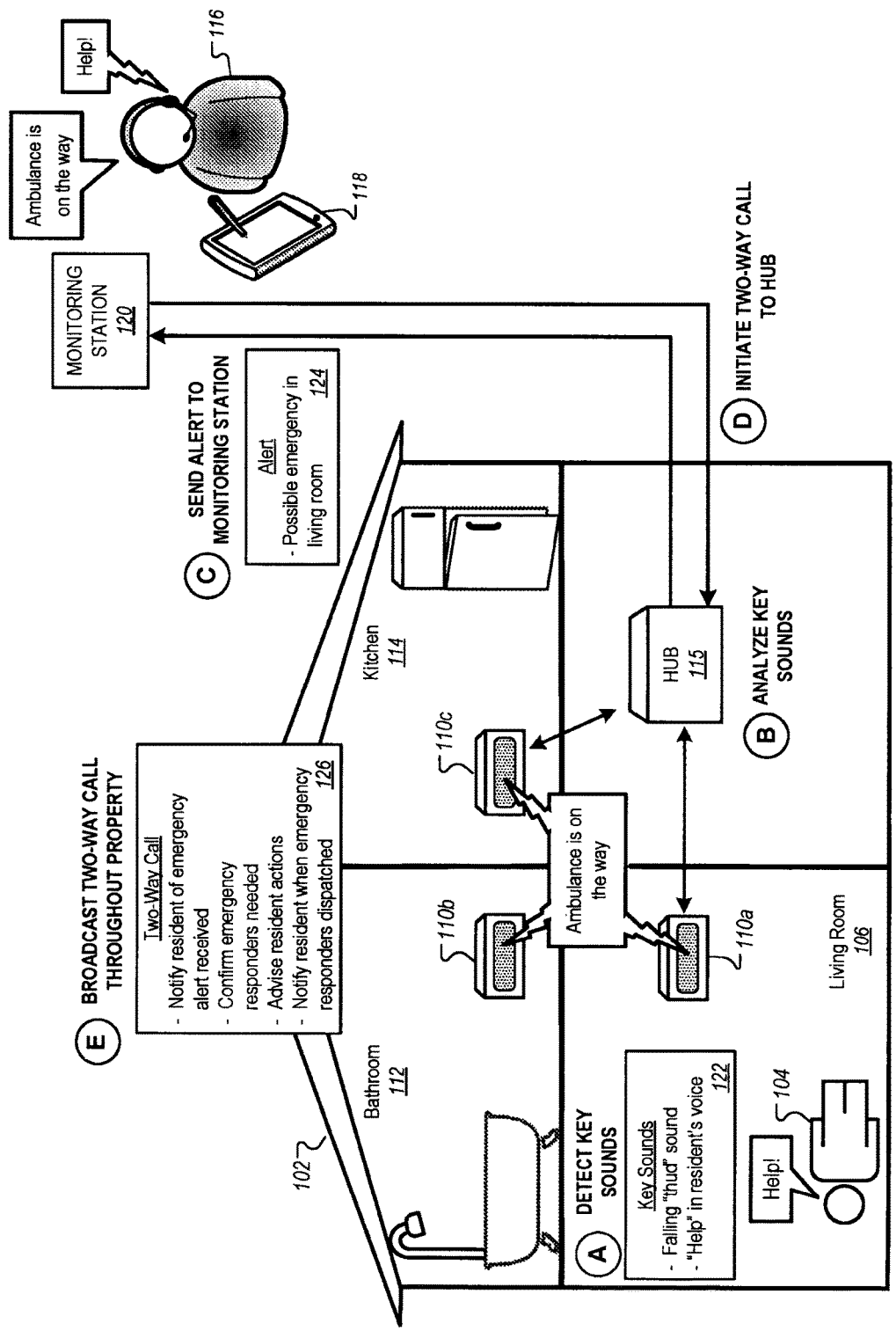
FIG. 1 illustrates an example smart speakerphone emergency monitoring system.

FIG. 1 illustrates an example smart speakerphone emergency monitoring system 100.

The property 102 may be a home, another residence, a place of business, a public space, or another facility. The property 102 includes a bathroom 112, a kitchen 114, and a living room 106.

The system 100 includes smart speakerphones 110a to 110c, collectively referred to as smart speakerphones 110. Smart speakerphone 110a is located in the living room 106, smart speakerphone 110b is located in the bathroom 112, and smart speakerphone 110c is located in the kitchen 114.

A smart speakerphone 110 can include one or more microphones and one or more speakers. The smart speakerphone 110 can detect sounds from the property 102. The one or more microphones of the smart speakerphone 110 may be arranged in an array. The microphone array can enable the smart speakerphone 110 to determine directionality of sounds. The smart speakerphone 110 can analyze the sounds, e.g., by performing speech recognition, measuring sound volume, and/or determining directionality. The smart speakerphone 110 can determine if a detected sound is a key sound 122.

A key sound 122 can be a sound that meets preset criteria. The criteria can be based on identifying sounds that indicate a likely emergency. Example criteria for a key sound 122 can include that the sound volume is above a preset volume, e.g., 80 or 90 decibels. In some examples, criteria for a key sound 122 can include that the sound matches one or more of a pre-programmed set of words or phrases. Pre-programmed words and phrases can include, for example, "help," "fire" "call an ambulance," "hospital," "I need a doctor," or "call the police." In some examples, criteria for a key sound 122 can include that the sound matches one or more of a pre-programmed set of non-word sounds. Pre-programmed non-word sounds can include, for example glass breaking, gunshots, human screams, and smoke alarms.

In some examples, criteria for a key sound 122 can include that the sound both matches one or more of a pre-programmed set of words or phrases, and is above a preset volume. For example, the word "fire" spoken within a normal speaking decibel range of 50 to 60 decibels may not meet criteria for a key sound 122. However, the word "fire" shouted at a decibel level of 80 decibels may meet criteria for a key sound 122.

When the smart speakerphone 110 detects a key sound 122, the key sound 122 can trigger the smart speakerphone 110 to perform an action. Example actions can include "waking" the smart speakerphone. When the smart speakerphone 110 wakes, the smart speakerphone 110 may begin recording real-time audio and/or sending audio data to a speakerphone hub device, e.g., hub 115.

The smart speakerphone 110 can include a battery that enables the smart speakerphone 110 to operate without an external power source. The smart speakerphone 110 can include a digital enhanced cordless telecommunications (DECT) transmitter and a DECT receiver for communicating with components of the system 100 such as the hub 115. The DECT transmitter and DECT receiver can enable the smart speakerphone 110 to communicate with the hub 115 without a network connection, such as a Wi-Fi connection. Components and operations of the smart speakerphone 110 are described in greater detail with reference to FIG. 3.

Smart speakerphones 110 can be placed in various locations at a property. For example, a user such as a resident 104 or installer may install one smart speakerphone 110 on each level of a property or one smart speakerphone 110 in each room of a property. The smart speakerphones 110 can be distributed so that most or all areas of the property 102 are within hearing range of at least one smart speakerphone 110.

In some implementations, the system 100 may undergo a calibration phase upon installation at the property 102. The calibration phase may include installing the smart speakerphones 110 throughout the property 102 and monitoring sounds over a period of time. The calibration phase can be used to establish baseline sound levels for routine occurrences at the property 102. Sounds detected by the smart speakerphones 110 can then be compared to the baseline sound levels to determine when anomalous sounds occur.

The calibration phase can also include programming the smart speakerphones 110 to recognize and identify voices of individual users of the smart speakerphones 110. For example, the property 102 may have two residents. The calibration phase can include programming the smart speakerphones 110 to differentiate a first resident's voice from a second resident's voice.

The hub 115 may be a computer system or other electronic device configured to communicate with the smart speakerphones 110 and a monitoring station 120. The hub 115 may include a processor, a chipset, a memory system, or other computing hardware. In some cases, the hub 115 may include application-specific hardware, such as a field-programmable gate array (FPGA), an application-specific integrated circuit (ASIC), or other embedded or dedicated hardware. The hub 115 may include software, which configures the unit to perform the functions described in this disclosure. The hub 115 can be, for example, the control unit 510 of FIG. 5.

In some implementations, a resident 104 of the property 102, or another user, communicates with the hub 115 through a physical connection (e.g., touch screen, keypad, etc.) and/or network connection. In some implementations, the resident 104 or other user communicates with the hub 115 through a software ("smart home") application installed on a mobile device or through the smart speakerphones 110. The hub 115 can include a DECT transmitter and DECT receiver for communicating with the smart speakerphones 110. The hub 115 can also include a cellular modem and/or SIM card for communicating with the monitoring station 120. The hub 115 can include a battery to enable operation without an external power source.

The hub 115 can receive key sounds 122 from the smart speakerphones 110 through a DECT transmission signal. In some examples, the hub 115 can analyze the key sounds 122 to determine if there is a likely emergency at the property 102.

The hub 115 communicates with the monitoring station 120 via a long-range data link. The long-range data link can include any combination of wired and wireless data networks. For example, the hub 115 may exchange information with the monitoring station 120 through a wide-area-network (WAN), a cellular telephony network, a cable connection, a digital subscriber line (DSL), a satellite connection, or other electronic means for data transmission. The hub 115 and the monitoring station 120 may exchange information using any one or more of various communication synchronous or asynchronous protocols, including the 802.11 family of protocols, GSM, 3G, 4G, 5G, LTE, CDMA-based data exchange or other techniques.

The monitoring station 120 can be a remote facility that monitors statuses of multiple properties, including the property 102. In some examples, the monitoring station 120 can be a central station monitored by a provider of the monitoring system 100. In some examples, the monitoring station 120 can be a central station monitored by a third party organization. The monitoring station 120 can include monitoring servers that can collect and analyze data from hubs of properties. The monitoring servers can be, e.g., the monitoring server 560 or the central alarm station server 570 of FIG. 5.

The monitoring station 120 can also include human operators 116. The operators 116 can receive indications of events at the properties from the monitoring servers. The operators 116 can view indications of events at the properties on a display of an electronic device, e.g., a tablet computer 118. The operators 116 may be able to view, for example, information including the address of a property, the number of residents of the property, and the names of residents. The operators 116 may also be able to view indications of alerts from the properties, and details about the cause of the alerts. For example, for an alert generated by a smart speakerphone 110, the operator 116 may be able to view information about the location of the smart speakerphone 110 that triggered the alert and the nature of the key sound 122 detected. If the alert was generated by a resident's voice, the operator 116 may be able to view the identity of the resident, based on voice recognition.

FIG. 1 includes stages (A) through (E), which represent a flow of data. In stage (A) of FIG. 1, the smart speakerphone 110a detects key sounds 122. The key sounds 122 include a sound indicative of falling, e.g., a "thud" sound. The key sounds 122 also include a sound of the resident 104 speaking the word "help."

One or more microphones of the smart speakerphone 110a detects the "thud" sound and the word "help." The smart speakerphone 110a can analyze the "thud" sound and the word "help," e.g., by performing speech recognition, by performing voice recognition, by measuring sound volume, and/or by determining the directionality of the sounds. For example, using voice recognition and speech recognition, the smart speakerphone 110a can identify that the word "help" was spoken by the resident 104 at a volume of 70 decibels.

The smart speakerphone 110a determines that the "thud" sound and the word "help" both meet the criteria for key sounds 122. For example, the "thud" sound may meet the criteria for key sounds 122 based on matching a pre-programmed sound. The word "help" may meet the criteria for key sounds 122 based on matching a pre-programmed word. The "thud" sound, the word "help," or both, may meet the criteria for key sounds 122 based on the volume being above a preset decibel level.

Upon identifying the key sounds 122, the smart speakerphone 110a wakes. The smart speakerphone 110a can begin recording sounds from the living room 106 and may begin sending data to the hub 115, e.g., via DECT transmission.

In stage (B) of FIG. 1, the hub 115 analyzes the key sounds 122. The hub 115 can receive the key sounds 122 from the smart speakerphone 110a via DECT transmission. The hub 115 may also receive key sounds 122 from the smart speakerphones 110b, 110c, e.g., if the key sounds 122 were detected by more than one smart speakerphone 110. For example, an event may occur in the living room 106 that produces a sound loud enough to be detected by both the smart speakerphones 110a and 110b. In another example, an event may occur between the living room 106 and the bathroom 112, such that the produced sound is detected by both the smart speakerphones 110a and 110b. The hub 115 can analyze the key sounds 122 from the smart speakerphones 110a and 110b. Based on the sound volume and/or directionality, the hub 115 may be able to determine if the event occurred in the living room 106, the bathroom 112, or somewhere in between the living room 106 and the bathroom 112.

The hub 115 may also receive real-time sounds from the smart speakerphones 110. For example, once the smart speakerphone 110a wakes, the smart speakerphone 110a can record real-time sounds and transmit the real-time sounds to the hub 115. In some examples, the smart speakerphone 110a may record real-time sounds for a designated period of time following detection of a key sound 122.

In stage (C) of FIG. 1, the hub 115 sends an alert 124 to the monitoring station 120. The hub 115 may send the alert 124 to the monitoring station 120 directly over the long-range data link, or may communicate with the monitoring station 120 through one or more intermediate servers. For example, the hub 115 can send the alert 124 to a server, e.g., a cloud server, of the monitoring system provider. The cloud server can relay the alert 124 to the monitoring station 120, which may be monitored by the monitoring system provider or by a third party organization.

The alert 124 can be, for example, a personal emergency response signal (PERS) that generally indicates a possible emergency at the property 102. In some examples, the alert 124 can include additional information related to the emergency. For example, the alert 124 can include that the emergency occurred in the living room 106. The alert 124 can also include that the smart speakerphone 110a detected the voice of the resident 104 speaking the word "help" at a volume of 70 decibels and/or that the smart speakerphone 110a detected a falling "thud" sound.

In stage (D) of FIG. 1, the monitoring station 120 initiates a two-way call 126 to the hub 115. In some examples, a monitoring server of the monitoring station 120 can automatically initiate the two-way call 126 to the hub 115 in response to receiving the alert 124. In some examples, the operator 116 can initiate the two-way call 126 to the hub 115, e.g., by selecting an option on the tablet computer 118. The monitoring station 120 initiates the two-way call 126 with the hub 115, e.g., by calling the cellular modem or SIM card of the hub 115. The hub 115 receives the two-way call 126.

In stage (E) of FIG. 1, the smart speakerphones 110 broadcast the two-way call 126 throughout the property 102. The hub 115 receives the two-way call 126 and sends the digital audio data of the two-way call 126 to the smart speakerphones 110 via DECT transmission. The broadcasted audio can include a voice of the operator 116. The operator can notify the resident 104 that an emergency alert was received. The operator 116 can request if the resident 104 needs assistance.

The resident 104 may be able to hear the voice of the operator 116 through the smart speakerphone 110a. The resident 104 can confirm that emergency help is needed by speaking to the smart speakerphone 110a. The voice of the resident 104 can be conveyed from the smart speakerphone 110a to the hub 115 via DECT, and to the monitoring station 120 via a cellular data link. In some examples, the operator 116 can request information from the resident 104 and can receive a response from the resident 104 through the two-way call 126. In some examples, the operator 116 can advise the resident 104 of recommended actions. If the resident 104 confirms that emergency help is needed, or if the resident 104 does not respond to the two-way call 126, the operator can request emergency response and can notify the resident 104 when emergency responders are dispatched. If the resident 104 informs the operator 116 that emergency help is not needed, the operator can cancel the alert 124. An audio recording of the two-way call 126 can be saved at the monitoring station 120.

In some examples, the monitoring station 120 may initiate a two-way call without first receiving an alert. For example, based on settings and preferences of the resident 104, the monitoring station 120 may initiate a two-way call to the hub 115 on a regular basis, e.g., once per day or once per week. The smart speakerphones 110 can broadcast the two-way call throughout the property 102, and the operator 116 can check on the resident 104, e.g., by asking how the resident 104 is doing. The resident 104 can respond to the two-way call from any location at the property 102 that is near a smart speakerphone 110. In the absence of a response from the resident 104, the operator 116 may contact a caretaker and/or emergency responders. Additionally, if the resident 104 responds that he or she needs help, the operator 116 may contact a caretaker and/or emergency responders.

Though described above as being performed by a particular component of system 100 (e.g., the hub 115 or the monitoring station 120), any of the various control, processing, and analysis operations can be performed by either the hub 115, the monitoring station 120, or another computer system of the monitoring system 100. For example, the hub 115, the monitoring station 120, or another computer system can analyze the data from the sensors to determine system actions. Similarly, the hub 115, the monitoring station 120, or another computer system can control the various sensors, and/or property automation controls to collect data or control device operation.

Figure 2:
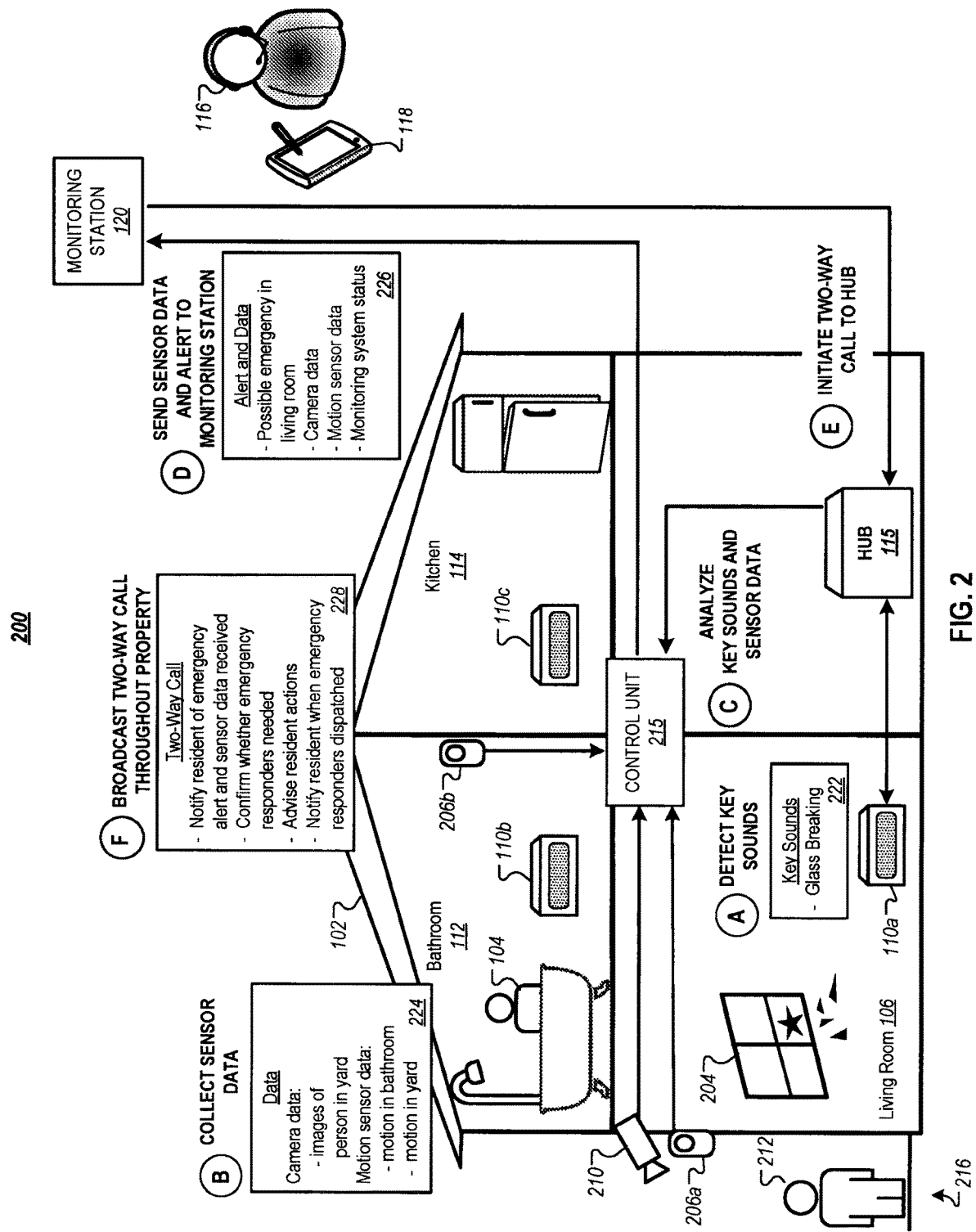
FIG. 2 illustrates an example monitoring system including smart speakerphone emergency monitoring and additional sensor data.

FIG. 2 illustrates an example monitoring system 200 including smart speakerphone emergency monitoring and additional sensor data. The property 102 can be the same property as shown in FIG. 1. In addition to the smart speakerphones 110, the system 200 may include additional sensors, such as video cameras, motion sensors, microphones, and temperature sensors, distributed about the property 102 to monitor conditions at the property 102. For example, sensors can be located in the bathroom 112, the kitchen 114, the living room 106, and a yard 216 of the property 102.

The system 200 includes smart speakerphones 110a to 110c, collectively referred to as smart speakerphones 110. Smart speakerphone 110a is located in the living room 106, smart speakerphone 110b is located in the bathroom 112, and smart speakerphone 110c is located in the kitchen 114.

The smart speakerphones 110 can send key sounds 222 to the hub 115, to the control unit 215, or both. The smart speakerphones 110 can send the key sounds 222 to the hub 115 and/or the control unit 215 through DECT transmission or through a network. In some examples, the smart speakerphones 110 send key sounds to the hub 115, and the hub 115 sends the key sounds to the control unit 215.

The monitoring system 200 includes motion sensors 206a and 206b, referred to as motion sensors 206. Motion sensor 206a is located in the yard 216 and motion sensor 206b is located in the bathroom 112. The motion sensors 206 can be, for example, passive infrared (PIR) sensors. PIR sensors can detect moving heat signatures, e.g., from people moving at the property 102.

The monitoring system 200 includes camera 210. The camera 210 is positioned to capture images from the yard 216. In some examples, the camera 210 can analyze images of the yard 216, e.g., through video analysis, to detect and identify people in the yard 216.

The motion sensors 206 can send motion sensor data to the control unit 215. The camera 210 can send camera data to the control unit 215. The control unit 215 can determine an occupancy of various areas of the property 102 based on the motion sensor data and the camera data. The occupancy can include a determination of whether or not people are present in individual rooms of the property 102, or the property 102 as a whole. For example, based on motion sensor data that indicates no movement in the bathroom 112, the control unit 215 may determine that no people are present in the bathroom 112. Similarly, based on motion sensor data that indicates movement in the yard 216, and camera data including images of a person in the yard 216, the control unit 215 may determine that a person is present in the yard 216.

The control unit 215 may receive sensor data through a network. The network may be any communication infrastructure that supports the electronic exchange of data between the hub 115 and the smart speakerphones 110. The network may include a local area network (LAN), a wide area network (WAN), the Internet, or other network topology. The network may be any one or combination of wireless or wired networks and may include any one or more of Ethernet, cellular telephony, Bluetooth, Wi-Fi, Z-Wave, ZigBee, Bluetooth, and Bluetooth LE technologies. In some implementations, the network may include optical data links. To support communications through the network, one or more devices of the monitoring system may include communications modules, such as a modem, transceiver, modulator, or other hardware or software configured to enable the device to communicate electronic data through the network.

FIG. 2 includes stages (A) through (F), which represent a flow of data. In stage (A) of FIG. 2, the smart speakerphone 110a detects key sounds. The key sounds 222 include a sound of glass breaking.

A microphone of the smart speakerphone 110a detects the glass breaking sound. The smart speakerphone 110a can analyze the glass breaking sound, e.g., by performing sound recognition, by measuring sound volume, and/or by determining the directionality of the sounds.

The smart speakerphone 110a determines that the glass breaking sound meets the criteria for key sounds 122. For example, the glass breaking sound may meet the criteria for key sounds 122 based on matching a pre-programmed sound. The glass breaking sound may also meet the criteria for key sounds 122 based on the volume being above a preset decibel level.

Upon determining that key sounds 122 have been detected, the smart speakerphone 110a wakes. The smart speakerphone 110a can begin recording sounds from the living room 106 and may begin sending audio data to the hub 115 via DECT transmission.

The hub 115 can receive the key sounds 122 from the smart speakerphone 110a via DECT transmission. The hub 115 may also receive key sounds 122 from the smart speakerphones 110b, 110c. The hub 115 may also receive real-time sounds from the smart speakerphones 110a, 110b, 110c. For example, once the smart speakerphone 110a wakes, the smart speakerphone 110a can record real-time sounds and transmit the real-time sounds to the hub 115. In some examples, the smart speakerphone 110a may record real-time sounds for a designated period of time following detection of a key sound 122.

In stage (B) of FIG. 2, the control unit 215 collects sensor data 224 from the sensors. For example, control unit 215 collects camera data from the camera 210, and motion sensor data from the motion sensors 206a, 206b.

The camera data includes images of a person 212 in the yard 216. In some examples, the camera 210 can analyze the images to determine that the person 212 is in the yard 216. In some examples, the camera can send the camera data to the control unit 215 and the control unit 215 can analyze the images to determine that the person 212 is in the yard 216.

In stage (C) of FIG. 2, the control unit 215 and the hub 115 analyze the key sounds 222 and the sensor data 224. In some examples, the hub 115 analyzes the key sounds 222, and the control unit 215 analyzes the sensor data. In some examples, the hub 115 sends the key sounds 222 to the control unit 215, and the control unit 215 analyzes the key sounds 222 and the sensor data 224.

The control unit 215 can analyze the sensor data 224 to determine occupancy of the property 102. The control unit 215 can analyze the camera data from the camera 210 and the motion sensor data from the motion sensor 206a to determine that there is a person 212 in the yard 216. The control unit 215 can analyze the motion sensor data from the motion sensor 206b to determine that there is a person in the bathroom 112. The control unit 215 can analyze the key sounds 222 to determine that glass has broken in the living room 106.

Based on analyzing the sensor data 224 and the key sounds 222, the control unit 215 may determine that there is likely an emergency at the property 102. Specifically, based on determining that glass has broken in the living room 106, and that a person 212 is in the yard 216, the control unit 215 can determine that there is likely a burglary in progress at the property 102. Based on determining that there is a person in the bathroom 112, the control unit 215 can determine that the resident 104 may be in danger.

In some examples, the control unit 215 may determine that the key sounds 222 likely do not indicate an emergency. For example, a resident 104 may be in the living room 106 watching television. The smart speakerphone 110a may detect the sound of a gunshot. The smart speakerphone 110a may determine that the gunshot meets the criteria for a key sound 222, e.g., based on the volume being above a preset volume and/or based on matching a pre-programmed sound. The smart speakerphone 110a can then wake, begin recording sound from the living room 106, and send audio data to the hub 115. The hub 115 can then send the audio data to the control unit 215.

The control unit 215 can analyze the audio data from the hub 115 and sensor data from the living room 106. Motion sensor data, microphone data, and/or camera data from the living room 106 may indicate the resident 104 watching television in the living room 106. The sounds recorded by the smart speakerphone 110a after the key sound 222 may indicate no unusual or distressing sounds. The sounds recorded by the smart speakerphone 110a may remain within a consistent decibel range, indicating that the sounds likely are produced by the television. Thus, the control unit 215 may determine that the key sound 222 of the gunshot likely does not indicate an emergency at the property 102.

In stage (D) of FIG. 2, the hub 115 and the control unit 215 send sensor data and an alert 226 to the monitoring station 120.

The alert can be, for example, a personal emergency response signal (PERS) that generally indicates a possible emergency at the property 102. In some examples, the alert can include additional information related to the emergency. For example, the alert can include that the emergency occurred in the living room 106. The alert can also include that the smart speakerphone 110a detected a key sound 222 of glass breaking.

The sensor data can include the camera data, the motion sensor data, and/or a determination of occupancy of the property 102. The sensor data can include a monitoring system status. For example, the monitoring system status may be "unarmed, stay" or "armed, away." The monitoring system status can provide an additional indication of whether the resident 104 is at the property 102.

In stage (E) of FIG. 2, the monitoring station 120 initiates a two-way call 228 to the hub 115. In some examples, a monitoring server of the monitoring station 120 can automatically initiate the two-way call 126 to the hub 115 in response to receiving the alert 124. In some examples, the operator 116 can initiate the two-way call 126 to the hub 115, e.g., by selecting an option on the tablet computer 118. The monitoring station 120 initiates the two-way call 126 with the hub 115, e.g., by calling the cellular modem or SIM card of the hub 115. The hub 115 receives the two-way call 126. In some examples, the monitoring station 120 can initiate the two-way call 228 to the control unit 215 instead of, or in addition to, the hub 115.

In stage (F) of FIG. 2, the smart speakerphones 110 broadcast the two-way call throughout the property 102. The hub 115 receives the two-way call 126 and sends the audio of the two-way call 126 to the smart speakerphones 110 via DECT transmission. The audio can include a voice of the operator 116. The operator can notify the resident 104 that an emergency alert was received. The operator 116 can request if the resident 104 needs assistance.

The resident 104 may be able to hear the voice of the operator 116 through the smart speakerphone 110b. The resident 104 can confirm that emergency help is needed by speaking to the smart speakerphone 110b. The voice of the resident 104 can be conveyed from the smart speakerphone 110b to the hub 115 via DECT, and to the monitoring station 120 via a cellular data link. In some examples, the operator 116 can request information from the resident 104 and can receive a response from the resident 104 through the two-way call 126. In some examples, the operator 116 can advise the resident 104 of recommended actions. If the resident 104 confirms that emergency help is needed, or if the resident 104 does not respond to the two-way call 126, the operator can request emergency response and can notify the resident when emergency responders are dispatched.

In some examples, the smart speakerphones 110 can broadcast alerts throughout the property 102. The monitoring system 200 may generate alerts when sensors at the property 102 detect events such as a break-in or fire. Typically in response to detecting events, the monitoring system 200 may sound an audible alarm such as a siren from the control unit 215. The smart speakerphones 110 can receive the alert from the control unit 215 over the network, and can also broadcast the alarm. In this way, residents who are at the property 102 but who are not near the control unit 215 can hear the alarm.

In some examples, in response to a detected event, the smart speakerphones 110 may broadcast a different audible sound than the control unit 215. For example, the control unit 215 may produce a siren sound in response to detecting a break-in in the living room 106. The smart speakerphones 110 may receive the break-in alert from the control unit 215 through the network, and may produce a different audible sound, such as the spoken words "break-in detected in the living room."

In some examples, the smart speakerphones 110 can broadcast alerts throughout the property 102 that are received from a source outside the property 102. For example, government authorities may generate and broadcast wireless messages related to emergencies such as severe weather and national emergencies. The control unit 215, the hub 115, or both, can receive a wireless emergency message from a government authority through a cellular connection. The control unit 215 and/or the hub 115 can broadcast the emergency message over the smart speakerphones 110 throughout the property 102. The control unit 215 and/or the hub 115 may include text-to-speech translation capability to convert the emergency message to speech for broadcasting at the property 102.

Though described above as being performed by a particular component of system 200 (e.g., the control unit 215 or the monitoring station 120), any of the various control, processing, and analysis operations can be performed by either the control unit 215, the monitoring station 120, or another computer system of the monitoring system 200. For example, the control unit 215, the monitoring station 120, or another computer system can analyze the data from the sensors to determine system actions. Similarly, the control unit 215, the monitoring station 120, or another computer system can control the various sensors, and/or property automation controls to collect data or control device operation.

Figure 3:
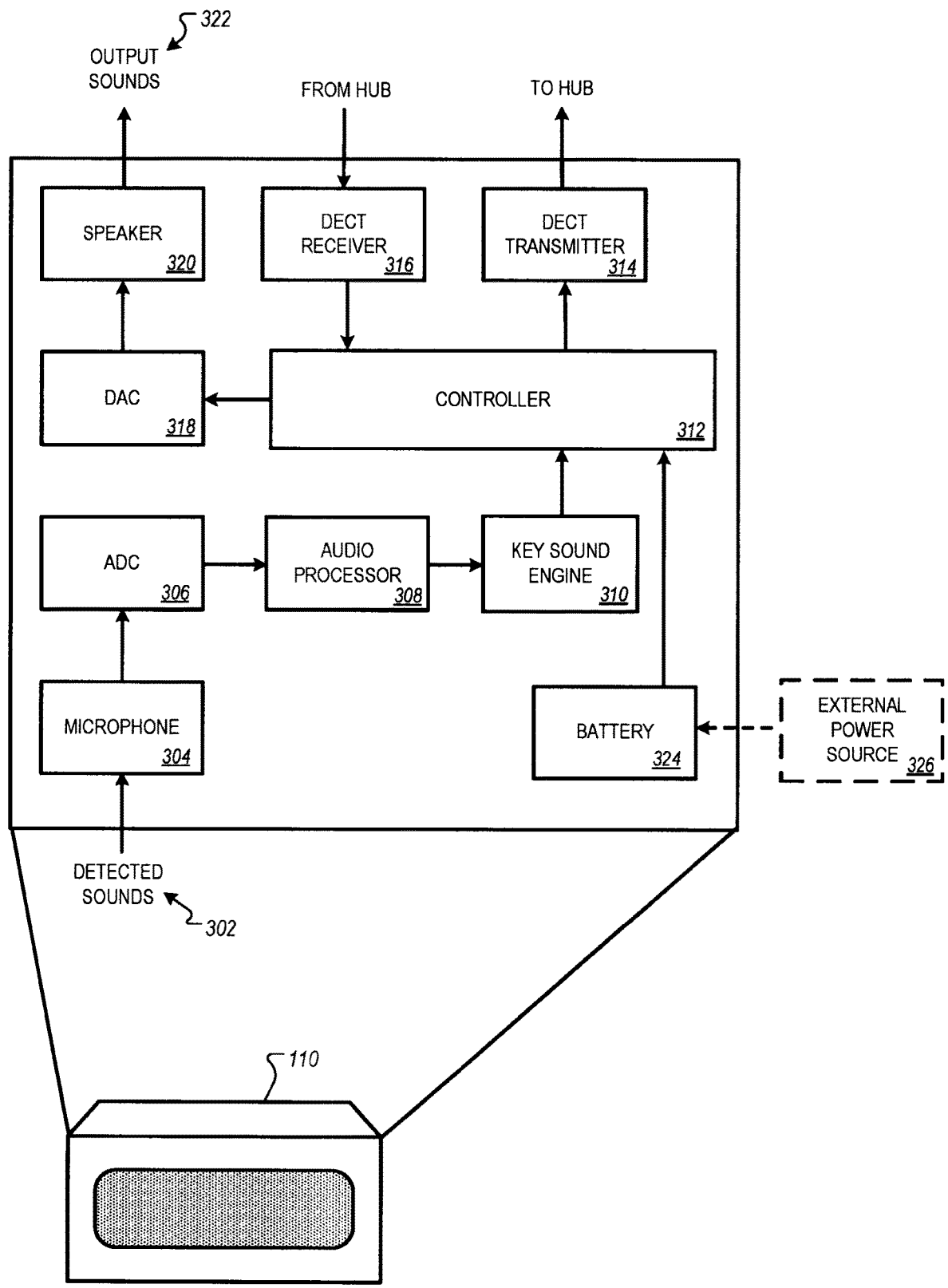
FIG. 3 is a block diagram showing components of an example smart speakerphone.

FIG. 3 is a block diagram showing components of an example smart speakerphone 110. To receive and process audio input, the smart speakerphone 110 includes one or more microphones 304, an analog-to-digital converter (ADC) 306, an audio processor 308, and a key sound engine 310. To communicate with a hub, the smart speakerphone 110 includes a DECT transmitter 314 and a DECT receiver 316. In some implementations, the smart speakerphone 110 can include a DECT transceiver instead of the DECT transmitter 314 and the DECT receiver 316. To produce audio output, the smart speakerphone 110 includes a digital-to-analog converter (DAC) 318 and one or more speakers 320. To power the smart speakerphone 110, the smart speakerphone 110 includes a battery 324. The smart speakerphone 110 can optionally include an external power source 326. The smart speakerphone 110 includes a controller 312 to control and coordinate operations of the various components of the smart speakerphone 110.

In operation, the smart speakerphone 110 detects sounds 302 with the one or more microphones 304. The microphones 304 can be far field microphones that are capable of detecting sounds from across a room, through a wall, and/or down a hallway of a property. The microphones 304 can be arranged in an array that can enable the smart speakerphone 110 to determine directionality of detected sounds 302.

The ADC 306 converts the analog audio to digital audio data. The audio processor 308 processes the digital audio data. For example, the audio processor 308 can measure sound volume and directionality of the detected sound 302. The audio processor 308 can also perform speech recognition and voice recognition on the detected sound 302.

The key sound engine 310 determines whether the detected sound 302 meets criteria for a key sound. For example, the key sound engine 310 can compare the detected sound 302 to pre-programmed non-word sounds, e.g., breaking glass and human screams. The key sound engine 310 can also compare the detected sound 302 to pre-programmed words or phrases, e.g., "help," and "I need an ambulance." The key sound engine 310 can also compare the volume of the detected sound 302 to a preset volume level. Based on determining that the detected sound 302 matches pre-programmed words, phrases, or non-word sounds, and/or is above a preset volume level, the key sound engine 310 can determine that the detected sound 302 meets criteria for a key sound.

In response to the key sound engine 310 identifying a key sound, the controller 312 can cause the smart speakerphone 110 to wake. When the smart speakerphone wakes, the smart speakerphone 110 may collect and record real-time sounds with the microphone 304. The smart speakerphone 110 may also transmit signals to the hub through the DECT transmitter 314. For example, the DECT transmitter 314 can transmit the key sounds and real-time sounds to the hub.

As described with reference to FIGS. 1 and 2, the hub may send an alert to a monitoring station. In response to receiving the alert, the monitoring station may initiate a two-way call to the hub. The hub can then send digital audio data of the two-way call to the DECT receiver 316. The DECT transmitter 314 and DECT receiver 316 require low amounts of energy compared to other types of transmitters and receivers. Thus, the DECT transmitter 314 and DECT receiver 316 can operate for long periods of time, sending and receiving high quality, lower power signals. The DECT transmitter 314 and DECT receiver 316 can each have a range of hundreds of feet.

When the smart speakerphone 110 receives the digital audio data from the hub, the DAC 318 converts the digital audio data to an analog signal. The speaker 320 outputs the sound 322 from the two-way call. For example, the speaker 320 may output the voice of an operator at the monitoring station.

The battery 324 enables the smart speakerphone 110 to operate without an external power source. However, the optional external power source 326 can be connected to the smart speakerphone 110 as a backup source of power and/or to charge the battery 324.

Figure 4:
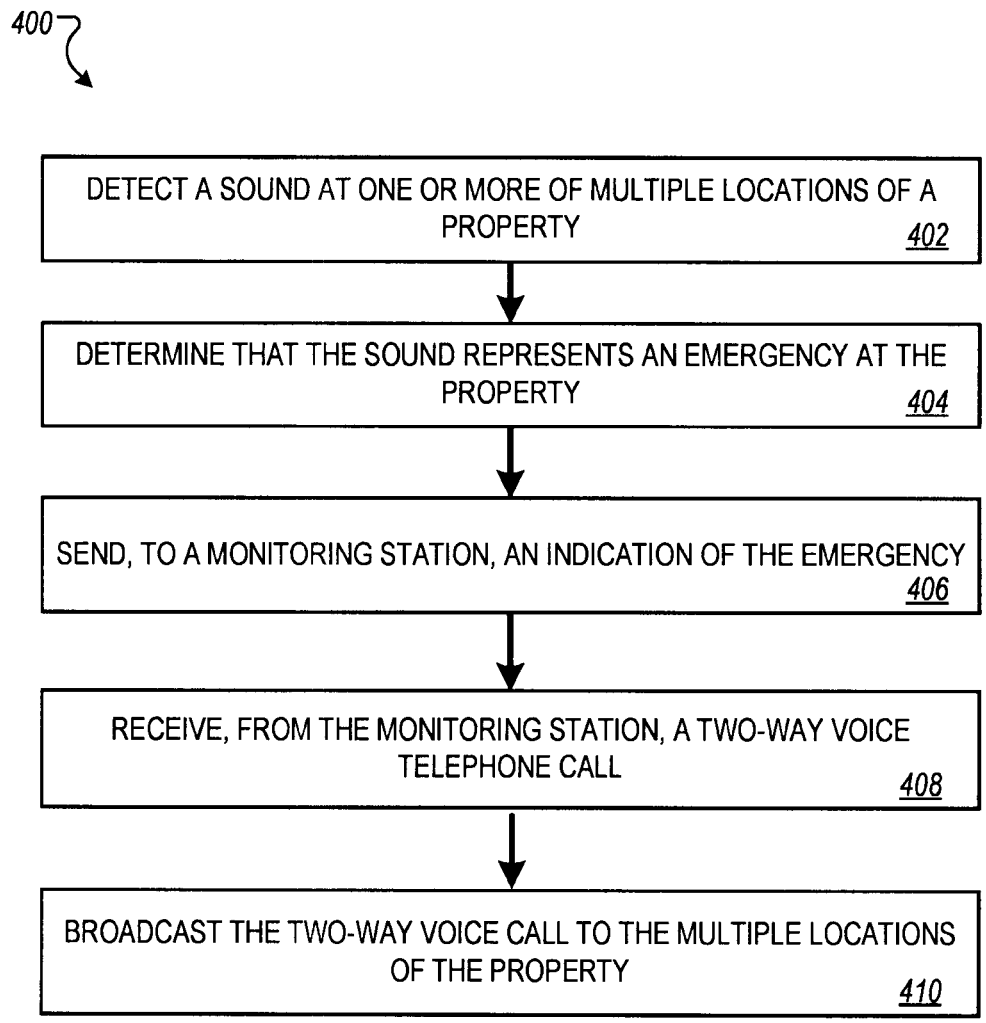
FIG. 4 is a flowchart of an example process for smart speakerphone emergency monitoring.

FIG. 4 is a flowchart of an example process for speakerphone emergency monitoring. The process 400 can be performed by one or more computer systems, for example, the smart speakerphones 110, the hub 115, or the control unit 215. In some implementations, some or all of the process 400 can be performed by a monitoring server at the monitoring station 120, or by a computer system located at the monitored property.

Briefly, the process 400 includes detecting a sound at one or more of multiple locations of a property (402), determining that the sound represents an emergency at the property (404), sending, to a monitoring station, an indication of the emergency (406), receiving, from the monitoring station, a two-way voice telephone call (408), and broadcasting the two-way voice call to the multiple locations of the property (410).

In greater detail, the process 400 includes detecting a sound at one or more of multiple locations of a property (402). In some implementations, detecting the sound at one or more of multiple locations of a property includes receiving audio data generated by one or more of a plurality of speakerphones. Each speakerphone is located at one of the multiple locations of the property. For example, the sound can be detected by one or more smart speakerphones, e.g., smart speakerphones 110*a*, 110*b*, 110*c*. The one or more multiple locations of the property can be, for example, the bathroom 112, kitchen 114, and living room 106 of the property 102. The smart speakerphones can be distributed such that most or all areas of the property are within hearing distance of at least one of the smart speakerphones.

In some implementations, each speakerphone includes an audio microphone and an audio speaker. Each speakerphone is configured to communicate with a speakerphone hub device using digital enhanced cordless telecommunications (DECT) signals. For example, the speakerphone 110 includes the microphone 304, for detecting sounds 302. The speakerphone 110 includes the speaker 320 for outputting sounds 322. The speakerphone 110 includes the DECT receiver 316 and the DECT transmitter 314 for communicating with a speakerphone hub device using DECT signals.

In some implementations, each of the plurality of speakerphone includes an array of microphones. For example, the array can include multiple microphones that are closely spaced. The microphones of the array can operate in tandem in order to localize sources of sound by determining directionality of detected sound.

In some implementations, receiving the audio data generated by one or more of the plurality of speakerphones includes receiving first audio data at a first volume from a first speakerphone at a first location of the property, and receiving second audio data at a second volume from a second speakerphone at second location of the property. For example, an occupant of the property may fall on the floor of the bathroom 112. A sound of the person falling in the bathroom 112 may be detected by a first speakerphone 110*b*, located in the bathroom 112, and by a second speakerphone 110*c*, located in the kitchen 114. The hub 115 may receive audio data at a first volume generated by the first speakerphone 110*b*, and audio data at a second volume generated by the second speakerphone 110*c*. The first volume will likely be greater than the second volume due to a closer proximity between the speakerphone 110*b* and the source of the sound.

The process 400 includes determining that the sound represents an emergency at the property (404). In some examples, the smart speakerphone determines that the sound represents an emergency. In some examples, a hub that receives audio data from multiple smart speakerphones can determine that the sound represents an emergency. In some examples, a control unit of a monitoring system can determine that the sound represents an emergency. For example, the control unit can correlate the detected sounds with sensor data from other sensors at the property. Based on analyzing the detected sounds and the sensor data, the control unit may determine that the sound represents an emergency.

In some implementations, determining that the sound indicates an emergency at the property includes analyzing audio characteristics of the sound and determining that the audio characteristics meet criteria for indicating an emergency at the property. For example, a key sound engine 310 of a smart speakerphone can determine that the sound represents an emergency at the property by comparing the detected sound to key sound criteria.

In some implementations, determining that the audio characteristics meet criteria for indicating an emergency at the property can include determining that the volume of the sound is greater than a threshold volume. For example, a threshold volume may be, for example, 100 decibels. A firearm may discharge in the living room 106. The speakerphone 110*a* generates audio data representing the firearm discharge at a volume of 140 decibels. The hub 115 receives the audio data from the speakerphone 110*a*. The hub 115 can determine that the audio data representing the firearm data at 140 decibels exceeds a threshold volume of 100 decibels. Based on determining that the volume of the sound at 140 decibels is greater than the threshold volume of 100 decibels, the hub 115 can determine that the audio characteristics meet criteria for indicating an emergency at the property 102.

In some implementations, determining that the audio characteristics meet criteria for indicating an emergency at the property includes comparing the audio characteristics of the sound to audio characteristics of stored sounds indicating an emergency at the property. The system may determine that the audio characteristics of the sound match the audio characteristics of one or more of the stored sounds indicating an emergency at the property. For example, the hub may perform acoustic signature recognition in order to determine a degree of matching between detected sounds and stored sounds.

In some implementations, the stored sounds include one or more of words, phrases, non-word human utterances, breaking sounds, falling sounds, audible alarms, or firearm sounds. For example, stored words and phrases can include "help," and "I need a doctor." Stored non-word human utterances can include, for example, sounds of human shouts and screams. Stored non-human sounds can include, for example, sounds of glass shattering, heavy objects falling, smoke alarms activating, carbon monoxide alarms activating, and firearms discharging.

In some implementations, determining that the sound indicates an emergency at the property includes receiving sensor data generated by one or more sensors at the property. The sensor data can include one or more of camera image data, motion sensor data, glass break sensor data, or temperature sensor data. The system can determine that the emergency is occurring based on the detected sound and the received sensor data.

In an example scenario, determining that the sound indicates an emergency at the property includes determining that the sound is indicative of falling. For example, a sound indicative of falling may be a "thud" or a "crash" sound. The hub 115 may receive audio data from the speakerphone 110a indicating detection of the sound indicative of falling in the living room 106. The system can also receive motion sensor data generated by a motion sensor data at the property. For example, the motion sensor data may be generated by a motion sensor located near the speakerphone that detected the sound, e.g., in the same room as the speakerphone. The motion sensor data may indicate no movement near the one or more locations of the property where the sound was detected. In some examples, the motion sensor may indicate rapid movement that was detected when a fall occurred, followed by no movement after the fall occurred. For example, a motion sensor in the living room may detect rapid movement while the occupant 104 falls, followed by no movement after the occupant 104 has fallen. Based on the sound indicative of falling and the motion sensor data, the system can determine that an occupant has fallen at the property. For example, based on the sound indicative of falling and based on no motion detected in the living room 106, the hub 115 can determine that the occupant 104 has fallen in the living room 106. Based on determining that an occupant of the property has fallen, the system can determine that the sound indicates an emergency at the property.

In another example scenario, determining that the sound indicates an emergency at the property includes determining that the sound is indicative of an object breaking. For example, a sound indicative of an object breaking can be a glass shattering sound, a crunch sound, a cracking sound, etc. The hub 115 may receive audio data from the speakerphone 110a indicating detection of the sound indicative of glass breaking in the living room 106. The system can also receive camera image data generated by a camera at the property. For example, the camera image data may be generated by a camera located near the speakerphone that detected the sound, e.g., in the same room as the speakerphone or positioned outside of the room where the speakerphone is located. The camera image data may indicate an unfamiliar person at the property. For example, the camera image data may indicate the presence of the person 212 outside of the property 102 near the window 204 of the living room 106. Based on the sound indicative of an object breaking and the camera image data, the system can determine that a break-in is occurring at the property. For example, based on the sound indicative of an object breaking and based on camera image data showing the person 212 outside of the window 204, the hub 115 can determine that the person 212 is breaking into the property 102. Based on determining that a break-in is occurring at the property, the system can determine that the sound indicates an emergency at the property.

In some implementations, the process includes determining a location of the emergency at the property. The system may determine the location of the emergency at the property by identifying the one or more of the plurality of speakerphones that detected the sound. For example, the sound of an occupant falling in the bathroom 112 may be detected by both the speakerphone 110b and the speakerphone 110c. The system can identify an installation location of each of the identified one or more of the plurality of speakerphones that detected the sound. The installation location of the speakerphone may be identified, e.g., based on input previously input by a user. In some examples, the installation location of the speakerphone may be identified based on a stored floorplan indicating the installation locations of each speakerphone.

As an example, the system can determine that the speakerphone 110b detected the sound, and is located in the bathroom 112. The system can determine that the speakerphone 110c detected the sound, and is located in the kitchen. In some examples, the system may identify a specific installation position of a speakerphone within a room of a property. For example, the system may determine that the speakerphone 110c is positioned atop the refrigerator in the kitchen 114, and that the refrigerator is located adjacent to an outer wall of the property 102. In another example, the system may determine that the speakerphone 110b is mounted to an interior wall of the bathroom 112 at an elevation of 4 feet off of the floor. The system can determine the location of the emergency at the property based on the installation location of each of the identified one or more of the plurality of speakerphones that detected the sound. Based on the installation location of the speakerphone 110b and 110c, the system can determine that the fall occurred on the upper level of the property 102.

In some implementations, determining the location of the emergency at the property based on the identified installation location of each of the one or more of the plurality of speakerphones that detected the sound includes accessing data indicating an audio detection range of each of the identified speakerphones that detected the sound. For example, the sound of an occupant falling in the kitchen 114 may be detected only by the speakerphone 110c. The system can access data indicating an audio detection range of the speakerphone 110c. The audio detection range of the speakerphone 110c may be, for example, ten feet. The system can also access data indicating a floorplan of the property. For example, the system can access data indicating a floorplan that specifies the size of the kitchen is thirty feet by thirty feet. The floorplan may also indicate a specific location of the speakerphone 110c within the kitchen, e.g., that the speakerphone 110c is located atop a table in the center of the kitchen. Based on the installation location of the identified one or more of the plurality of speakerphones that detected the sound, the audio detection range of each of the identified speakerphones that detected the sound, and the floorplan of the property, the system can determine a location of the emergency at the property. For example, based on the installation location of the speakerphone 110c in the kitchen, the audio detection range of ten feet, and the floorplan indicating the size of the kitchen as thirty feet by thirty feet, the system can determine that the emergency at the property is located in the kitchen.

In some implementations, the process includes determining, based on audio data generated by each microphone of the array of microphones, a directionality of the sound. Based on determining the directionality of the sound, the system can determine the location of the emergency at the property. For example, sounds of a person shouting in the bathroom 112 may be detected by the speakerphone 110b, which may include an array of microphones. The hub 115 can receive audio data generated by the speakerphone 110b representing the shouting sounds. Based on the audio data generated by each microphone of the array, the hub 115 can determine the directionality of the sounds. The directionality of the sounds may be from the direction of the bathtub in the bathroom 112. Based on the directionality of the sounds, the hub 115 can determine that the emergency is occurring in or near the bathtub in the bathroom 112.

In some implementations, the process includes comparing a volume of the first audio data from the first speakerphone to a volume of the second audio data from the second speakerphone. Based on comparing the volume of the first audio data to the volume of the second audio data, the system can determine the location of the emergency at the property. For example, an occupant of the property may fall on the floor of the bathroom 112 and the sound may be detected by a first speakerphone 110b, and by a second speakerphone 110c. The hub 115 may receive audio data at a first volume generated by the first speakerphone 110b, and audio data at a second volume generated by the second speakerphone 110c. The system can compare the volume of the first audio data from the first speakerphone 110b to the volume of the second audio data from the second speakerphone 110c, and determine that the first volume is greater than the second volume. Based on determining that the first volume is greater than the second volume, the system can determine that the location of the emergency is nearer to the first speakerphone 110b than to the second speakerphone 110c.

The process 400 includes sending, to a monitoring station, an indication of the emergency (406). The hub or a control unit may send the indication of the emergency to the monitoring station. The indication can include an alert, and may include additional sensor data from the smart speakerphones and/or other sensors at the property. The indication of the emergency may include a monitoring system status, e.g., "armed, stay," or "armed, away."

In some implementations, sending, to a monitoring station, an indication of the emergency includes sending, to the monitoring station, data indicating a type of emergency. For example, the indication of the emergency can include data indicating that the type of emergency is, e.g., an occupant falling, a break-in, a firearm discharge, a fire alarm activation, etc.

In some implementations, sending, to a monitoring station, an indication of the emergency includes sending, to the monitoring station, data indicating a location of the emergency at the property. For example, the indication of the emergency can include data indicating that the location of the emergency is, e.g., in the bathroom, in the bathtub, on the top floor, between the bathroom and the kitchen, etc.

The process 400 includes receiving, from the monitoring station, a two-way voice telephone call (408). In some examples, a monitoring server at the monitoring station may automatically initiate a two-way call to the property in response to receiving the indication of the emergency. In some examples, a human operator at the monitoring station may initiate the two-way call in response to receiving the indication of the emergency. The two-way call can be received by the hub at the property.

The process 400 includes broadcasting the two-way voice call to the multiple locations of the property (410). For example, upon receiving the two-way call, the hub can send the call audio to any or all of the smart speakerphones throughout the property. The smart speakerphones can broadcast the call audio, e.g., the voice of the operator. A user can then respond to the call by speaking near any of the smart speakerphones. The operator and the user can communicate through the two-way call, and the operator can confirm if emergency assistance is needed at the property.

In some implementations, broadcasting the two-way voice call to the multiple locations of the property includes broadcasting the two-way voice call through the plurality of speakerphones. For example, the system may broadcast the two-way voice call through all of the speakerphone 110a-110c.

In some implementations, broadcasting the two-way voice call to the multiple locations of the property includes identifying the one or more of the plurality of speakerphones that detected the sound, and broadcasting the two-way voice call through each of the identified one or more of the plurality of speakerphones that detected the sound. For example, the system may determine that the sound was detected by the speakerphones 110b and 110c and not by the speaker phone 110a. Based on determining that the sound was detected by the speakerphones 110b and 110c and not by the speaker phone 110a, the system can broadcast the two-way voice call through both the speakerphones 110b and 110c and not the speaker phone 110a.

In some examples, upon receiving a response from an occupant through a particular speakerphone, the system may deactivate one or more of the other speakerphones. For example, the system may initially broadcast the two-way voice call through both the speakerphones 110b and 110c. The occupant may respond by speaking near the speakerphone 110b. The system can detect the occupant's voice through the speakerphone 110b. Based on detecting the occupant's voice through the speakerphone 110b, the system can deactivate the speakerphone 110c.

Figure 5:
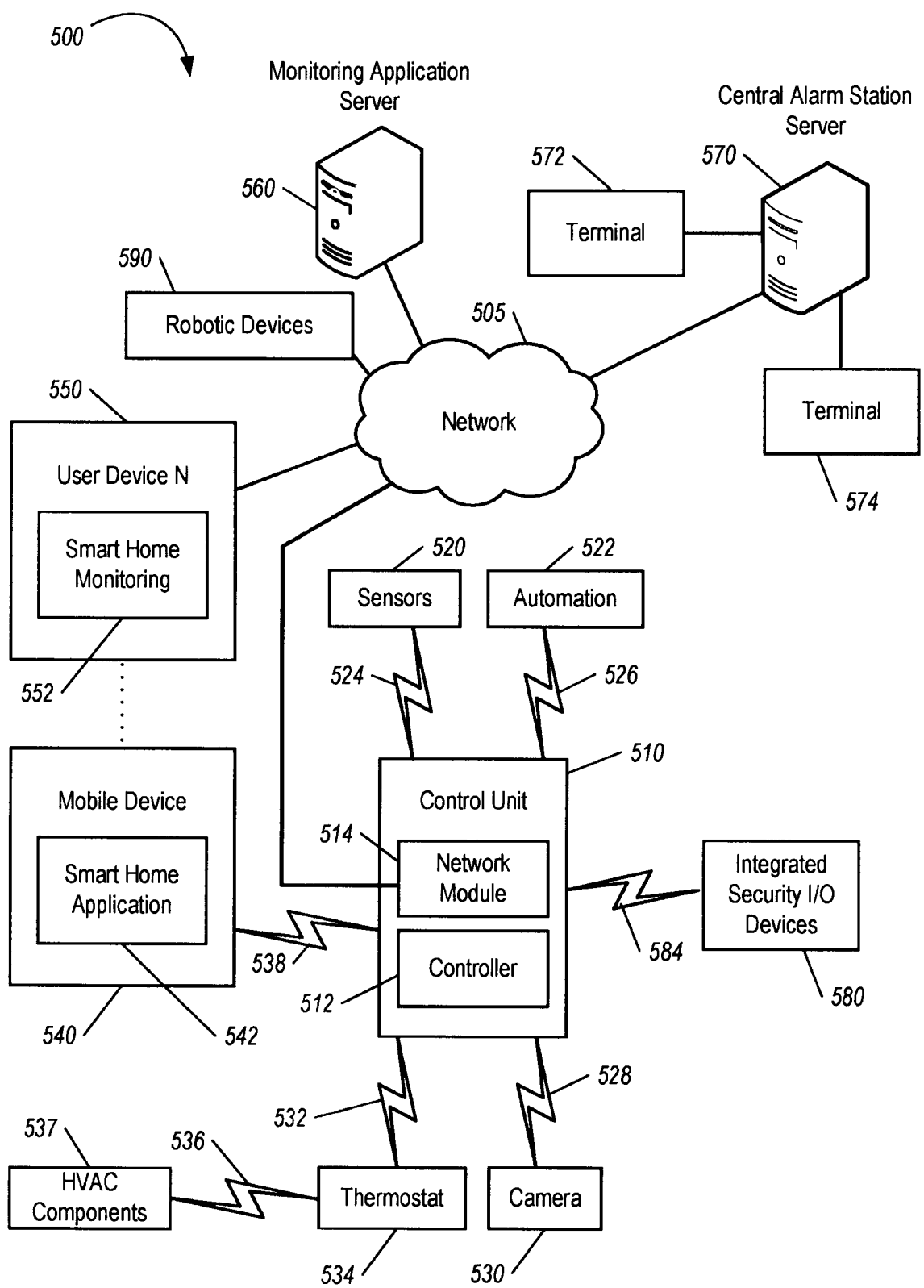
FIG. 5 shows a diagram illustrating an example monitoring system.

FIG. 5 is a diagram illustrating an example of a home monitoring system 500. The monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as an indoor smart speakerphone, an outdoor smart speakerphone, a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more smart speakerphones, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

In addition, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Power-line" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events generated by the control unit 510. In this example, the monitoring server 560 may exchange electronic communications with the network module 514 included in the control unit 510 to receive information regarding events detected by the control unit 510. The monitoring server 560 also may receive information regarding events from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The monitoring server 560 can be configured to provide information (e.g., activity patterns) related to one or more residents of the home monitored by the system 500 (e.g., the resident 104). For example, one or more of the sensors 520, the home automation controls 522, the camera 530, the thermostat 534, and the integrated security devices 580 can collect data related to a resident including location information (e.g., if the resident is home or is not home) and provide location information to the thermostat 534.

The central alarm station server 570 is an electronic device configured to provide alarm monitoring service by exchanging communications with the control unit 510, the one or more user devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the home monitoring application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a home monitoring application 542. The home monitoring application 542 refers to a software/firmware program running on the corresponding mobile device that enables the user interface and features described throughout. The user device 540 may load or install the home monitoring application 542 based on data received over a network or data received from local media. The home monitoring application 542 runs on mobile devices platforms, such as iPhone, iPod touch, Blackberry, Google Android, Windows Mobile, etc. The home monitoring application 542 enables the user device 540 to receive and process image and sensor data from the monitoring system.

The user device 540 may be a general-purpose computer (e.g., a desktop personal computer, a workstation, or a laptop computer) that is configured to communicate with the monitoring server 560 and/or the control unit 510 over the network 505. The user device 540 may be configured to display a smart home user interface 552 that is generated by the user device 540 or generated by the monitoring server 560. For example, the user device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, and the robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method, comprising:
   receiving, by a hub device, first audio data from a first device of a plurality of devices that indicates that the first device detected sonic energy and second audio data from a second device of the plurality of devices that indicates that the second device detected sonic energy;
   determining, by the hub device, that the first audio data and the second audio data likely represent a sound from a single source;
   determining, by the hub device using the first audio data and the second audio data, a predicted location of the single source;
   comparing, by the hub device, audio characteristics of the first audio data and of the second audio data to audio characteristics of one or more stored predetermined sounds;
   determining, by the hub device, that the audio characteristics of at least one of the first audio data and the second audio data satisfy criteria for matching audio characteristics of:
      a first stored predetermined sound from the one or more stored predetermined sounds, the first stored predetermined sound being a verbal sound, and
      a second stored predetermined sound from the one or more stored predetermined sounds, the second stored predetermined sound being a non-verbal sound, wherein the criteria for matching the audio characteristics of the second stored predetermined sound include an audio volume being greater than a threshold audio volume for non-verbal sounds;
   determining that the first stored predetermined sound and the second stored predetermined sound are each associated with a falling human;
   in response to (a) determining that the audio characteristics of at least one of the first audio data and the second audio data satisfy criteria for matching audio characteristics of the first stored predetermined sound and the second stored predetermined sound and (b) determining that the first stored predetermined sound and the second stored predetermined sound are each associated with a falling human, transmitting, by the hub device and to a monitoring station:
      a request to initiate a voice call with the monitoring station; and
      a message indicating that a human has likely fallen at the predicted location;
   receiving, by the hub device and from the monitoring station, third audio data encoding speech for the voice call with the monitoring station;
   selecting, by the hub device, a subset of the plurality of devices using the predicted location of the single source; and
   in response to receiving the third audio data encoding speech for the voice call with the monitoring station, transmitting, by the hub device, the third audio data encoding speech for the voice call with the monitoring station to the subset of the plurality of devices to cause the respective recipient devices of the subset to output sound in response.

2. The method of claim 1, comprising:
   determining, by the hub device, that the first audio data represents a voice of a user; and
   determining, by the hub device and using the first audio data, an identity of the user,
   wherein the message indicates the identity of the user.

3. The method of claim 1, wherein:
   the first device comprises an array of microphones,
   the first audio data includes audio signals from two or more microphones of the array of microphones, the method comprising:
      determining, by the hub device and using the first audio data, a directionality of the sound relative to a location of the first device; and
      determining the predicted location of the single source using the directionality of the sound.

4. The method of claim 1, wherein the first stored predetermined sound comprises one or more of a word, a phrase, or a non-word human utterance, and the second stored predetermined sound comprises one or more of a breaking sound or a falling sound.

5. The method of claim 1, wherein receiving, by the hub device and from the first device of the plurality of devices, the first audio data comprises receiving, from the first device, the first audio data via a digital enhanced cordless telecommunications (DECT) signal.

6. The method of claim 1, wherein each device of the plurality of devices comprises a microphone and a speaker and is located at one of multiple different locations.

7. The method of claim 1, comprising:
receiving, by the hub device and from a particular device of the subset of the plurality of devices, fourth audio data encoding speech for the voice call;
receiving, by the hub device and from the monitoring station, fifth audio data encoding speech for the voice call; and
in response to receiving the fourth audio data for the voice call from the particular device:
transmitting, by the hub device, the fifth audio data encoding speech for the voice call to the particular device; and
determining, by the hub device, not to transmit the fifth audio data to the plurality of devices excluding the particular device.

8. The method of claim 1, wherein determining, by the hub device using the first audio data and the second audio data, the predicted location of the single source comprises:
identifying an installation location of the first device and of the second device at a property; and
determining the predicted location of the single source using the installation location of the first device and of the second device.

9. The method of claim 8, wherein determining the predicted location of the single source using the installation location of the first device and of the second device comprises:
accessing data indicating a first audio detection range of the first device and a second audio detection range of the second device;
accessing data indicating a floorplan of the property; and
determining the predicted location of the single source using (i) the installation location of the first device and of the second device, (ii) the first audio detection range of the first device and the second audio detection range of the second device, and (iii) the floorplan of the property.

10. The method of claim 8, wherein determining the predicted location of the single source using the installation location of the first device and of the second device comprises:
determining a first volume of the first audio data;
determining a second volume of the second audio data;
accessing data indicating a floorplan of the property; and
determining the predicted location of the single source using (i) the installation location of the first device and of the second device, (ii) the first volume of the first audio data, (iii) the second volume of the second audio data, and (iv) the floorplan of the property.

11. The method of claim 1, wherein determining that the first audio data and the second audio data likely represent a sound from a single source comprises determining that the first audio data and the second audio data were generated at a substantially same time.

12. The method of claim 1, comprising selecting the subset of the plurality of devices using the predicted location of the single source, each device of the subset of the plurality of devices being within a hearing range to the predicted location of the single source.

13. The method of claim 1, wherein the third audio data encoding speech for the voice call represents live speech from an operator of the monitoring station.

14. The method of claim 1, wherein:
the first stored predetermined sound comprises a spoken word "help;" and
the second stored predetermined sound comprises a "thud" sound.

15. The method of claim 14, wherein the message indicating that the human has likely fallen at the predicted location includes an indication of detection of the spoken word "help" and the "thud" sound.

16. The method of claim 15, wherein the message indicating that the human has likely fallen at the predicted location includes an indication of a detected audio volume of the spoken word "help" and of the "thud" sound.

17. The method of claim 1, wherein the criteria for matching the audio characteristics of the first stored predetermined sound include an audio volume being greater than a threshold audio volume for verbal sounds.

18. The method of claim 1, comprising:
receiving, by the hub device, motion sensor data generated by one or more motion sensors;
determining, using the motion sensor data, that a motion pattern at the predicted location corresponds with a falling human; and
determining that the human has likely fallen at the predicted location in response to:
determining that the motion pattern at the predicted location corresponds with a falling human; and
determining that the first stored predetermined sound and the second stored predetermined sound are each associated with a falling human.

19. A system comprising:
a plurality of devices, each device located at one of multiple locations; and
a hub device configured to perform operations comprising:
receiving, by a hub device, first audio data from a first device of a plurality of devices that indicates that the first device detected sonic energy and second audio data from a second device of the plurality of devices that indicates that the second device detected sonic energy;
determining, by the hub device, that the first audio data and the second audio data likely represent a sound from a single source;
determining, by the hub device using the first audio data and the second audio data, a predicted location of the single source;
comparing, by the hub device, audio characteristics of the first audio data and of the second audio data to audio characteristics of one or more stored predetermined sounds;
determining, by the hub device, that the audio characteristics of at least one of the first audio data and the second audio data satisfy criteria for matching audio characteristics of:
a first stored predetermined sound from the one or more stored predetermined sounds, the first stored predetermined sound being a verbal sound, and a second stored predetermined sound from the one or more stored predetermined sounds, the second stored predetermined sound being a non-verbal sound, wherein the criteria for matching the audio characteristics of the second stored predetermined sound include an audio volume being greater than a threshold audio volume for non-verbal sounds;

determining that the first stored predetermined sound and the second stored predetermined sound are each associated with a falling human;

in response to (a) determining that the audio characteristics of at least one of the first audio data and the second audio data satisfy criteria for matching audio characteristics of the first stored predetermined sound and the second stored predetermined sound and (b) determining that the first stored predetermined sound and the second stored predetermined sound are each associated with a falling human, transmitting, by the hub device and to a monitoring station:

a request to initiate a voice call with the monitoring station; and a message indicating that a human has likely fallen at the predicted location;

receiving, by the hub device and from the monitoring station, third audio data encoding speech for the voice call with the monitoring station;

selecting, by the hub device, a subset of the plurality of devices using the predicted location of the single source; and in response to receiving the third audio data encoding speech for the voice call with the monitoring station, transmitting, by the hub device, the third audio data encoding speech for the voice call with the monitoring station to the subset of the plurality of devices to cause the respective recipient devices of the subset to output sound in response.

20. A non-transitory computer-readable medium storing software comprising instructions executable by one or more computers which, upon such execution, cause the one or more computers to perform operations comprising:

receiving, by a hub device, first audio data from a first device of a plurality of devices that indicates that the first device detected a sound and second audio data from a second device of the plurality of devices that indicates that the second device detected a sound;

determining, by the hub device, that the first audio data and the second audio data likely represent a sound from a single source;

determining, by the hub device using the first audio data and the second audio data, a predicted location of the single source;

comparing, by the hub device, audio characteristics of the first audio data and of the second audio data to audio characteristics of one or more stored predetermined sounds;

determining, by the hub device, that the audio characteristics of at least one of the first audio data and the second audio data satisfy criteria for matching audio characteristics of:

a first stored predetermined sound from the one or more stored predetermined sounds, the first stored predetermined sound being a verbal sound, and a second stored predetermined sound from the one or more stored predetermined sounds, the second stored predetermined sound being a non-verbal sound, wherein the criteria for matching the audio characteristics of the second stored predetermined sound include an audio volume being greater than a threshold audio volume for non-verbal sounds;

determining that the first stored predetermined sound and the second stored predetermined sound are each associated with a falling human;

in response to (a) determining that the audio characteristics of at least one of the first audio data and the second audio data satisfy criteria for matching audio characteristics of the first stored predetermined sound and the second stored predetermined sound and (b) determining that the first stored predetermined sound and the second stored predetermined sound are each associated with a falling human, transmitting, by the hub device and to a monitoring station:

a request to initiate a voice call with the monitoring station; and a message indicating that a human has likely fallen at the predicted location;

receiving, by the hub device and from the monitoring station, third audio data encoding speech for the voice call with the monitoring station;

selecting, by the hub device, a subset of the plurality of devices using the predicted location of the single source; and in response to receiving the third audio data encoding speech for the voice call with the monitoring station, transmitting, by the hub device, the third audio data encoding speech for the voice call with the monitoring station to the subset of the plurality of devices to cause the respective recipient devices of the subset to output sound in response.

* * * * *